United States Patent [19]
Rosio et al.

[11] Patent Number: 6,042,793
[45] Date of Patent: Mar. 28, 2000

[54] PRESSURE VESSEL SAFETY LOCKING MECHANISM

[75] Inventors: Larry R. Rosio, Fairview; Richard K. Reber, Erie; Marc Quint, Fairview, all of Pa.

[73] Assignee: Snap-Tite Technologies, Inc., Wilmington, Del.

[21] Appl. No.: 08/998,320

[22] Filed: Dec. 24, 1997

[51] Int. Cl.[7] .............................. B01J 3/03; B65D 45/32
[52] U.S. Cl. ..................... 422/296; 422/102; 422/242; 277/632; 220/319
[58] Field of Search .................... 422/102, 242, 422/295, 296; 220/233, 319; 277/632; 292/256.6

[56] References Cited

U.S. PATENT DOCUMENTS

| | | | |
|---|---|---|---|
| 2,811,379 | 10/1957 | Hemsworth | 277/632 |
| 4,325,914 | 4/1982 | Ruyak | 422/102 |
| 5,335,807 | 8/1994 | Gregory | 220/315 |

*Primary Examiner*—Elizabeth McKane
*Attorney, Agent, or Firm*—Woodling, Krost and Rust

[57] ABSTRACT

The invention discloses a plurality of cylindrical slugs linked together by a cable. The slugs are separated by spacers and the cable is crimped at each end thereof to keep the slugs and spacers from coming off the cable. The cable-slugs-spacers assembly is inserted through a guide tube and into an annulus locking the cover of the pressure vessel to the housing of the vessel. A relief mechanism is provided in the cover to ensure that the cable-slugs-spacers assembly is fully inserted in the annulus thus preventing accidental extrication of the cover when the vessel is pressurized. A proximity sensor is positioned in the housing of the vessel and senses the pressure of the first slug inserted into the annulus thus insuring that the cable-slugs-spacers assembly has been fully inserted in the annulus. A coupling is provided on one end of the cable-slugs-spacers assembly to positively lock the assembly in place ensuring that the cover will not be extricated from the pressure vessel under pressure.

19 Claims, 13 Drawing Sheets

PRESSURE VESSEL SAFETY LOCKING MECHANISM

FIELD OF THE INVENTION

This invention is in the field of pressure vessels which can be quickly and easily opened and closed. These pressure vessels are used for a variety of purposes. They can be used in laboratories or they can be used in industry. The pressure vessels normally experience pressures in the 700 to 1500 psia range but they can experience pressures as high as 2000 psia.

BACKGROUND OF THE INVENTION

U.S. Pat. No. 4,325,914 to Ruyak was issued Apr. 20, 1982 for a Laboratory Pressure Vessel. Ruyak disclosed a laboratory pressure vessel having a housing and a cover secured together by means of a flexible spring. The spring is limited in regard to its shear strength.

The present invention is not so limited. Specifically, the instant invention provides a series of slugs which are spaced in an annulus which secure the housing and cover together and provide greater shear strength than the spring. Additionally, the instant invention provides for release of pressure within the vessel, or put another way the venting of pressure within the vessel when the slugs are not fully inserted into the annulus. A proximity probe provides a permissive signal allowing pressurization of the pressure vessel only when the slugs have been fully inserted into the annulus.

SUMMARY OF THE INVENTION

It is an object of the present invention to provide a pressure vessel which includes a housing and a cover. The housing further includes a slot as does the cover. The slots in the housing and the cover form an annulus within the pressure vessel. A plurality of slugs are linked together by a cable. The cable passes through apertures located in each slug. The cable is crimped at each end thereof linking the slugs together. The slugs and the cable are interposed in the annulus which prevents the cover from being extricated from the housing when the vessel is pressurized.

It is a further object of the present invention to provide a plunger bore within the cover, a plunger, a stop and a pressure release port. The plunger is moved by one of the slugs which positions the plunger so as to prohibit relief of pressure within the vessel. This allows venting of the pressure vessel when the cable and slugs are not fully inserted into the annulus. This is a protective or safety mechanism.

It is a further object of the present invention to employ spacers between adjacent slugs.

It is a further object of the present invention to actuate the plunger with the first slug which is inserted into the annulus.

It is a further object of the present invention to position the plunger at the point furthest remote from the entrance way of the slugs into the pressure vessel.

It is a further object of the present invention to provide a guide tube for guiding the slugs into the annulus.

It is a further object of the present invention to provide a proximity probe for sensing one of the slugs in the annulus.

It is a further object of the present invention to provide a proximity probe which senses the first slug which is inserted into the annulus.

It is a further object of the present invention to provide a coupling which positively locks the cable-slugs-spacers assembly into place with respect to its full insertion into the annulus.

It is a further object of the present invention to provide slugs having chamfered ends for insertion into the annulus.

It is a further object of the present invention to provide slots in each of the cover and the housing of the pressure vessel. Further, these slots include grooves therein for relieving stress.

The present invention is a pressure vessel which includes a housing and a cover. The housing includes a slot and a guide tube. The cover includes a slot which in combination with the slot of the housing forms an annulus. A plurality of slugs each having an aperture therethrough are connected together by a cable. Spacers can be interposed between adjacent slugs. The cable, slugs, and spacers can be connected to a coupling. This assembly, to wit, the coupling-cable-slugs-spacers assembly, is inserted through the guide tube and into the annulus formed by the slots of the housing and the cover. The male half of the coupling is secured to the cable-slugs-spacers assembly and is locked to a female portion of the coupling which is affixed to the guide tube of the housing. The pressure vessel includes structure for relieving pressure within the vessel when the male portion of the coupling, the slugs, and the spacers are not fully inserted into the guide tube and into the annulus. A proximity probe senses when the slugs have been fully inserted into the annulus.

A better understanding of the invention will be had when the Brief Description of the Drawings, the Detailed Description of the Invention, and the Claims which follow are considered.

BRIEF DESCRIPTION OF THE DRAWINGS

FIG. 2 is a cross-sectional view of the pressure vessel assembly taken along line 2'—2' of FIG. 1A; FIG. 2 illustrates the housing, cover, the cable-slugs-spacers assembly, the guide tube and the coupling in cross-section.

3

A better understanding of the drawing figures will be had when taken in conjunction with the Detailed Description of the Drawings and the Claims which follow.

DETAILED DESCRIPTION OF THE INVENTION

Figure 1:
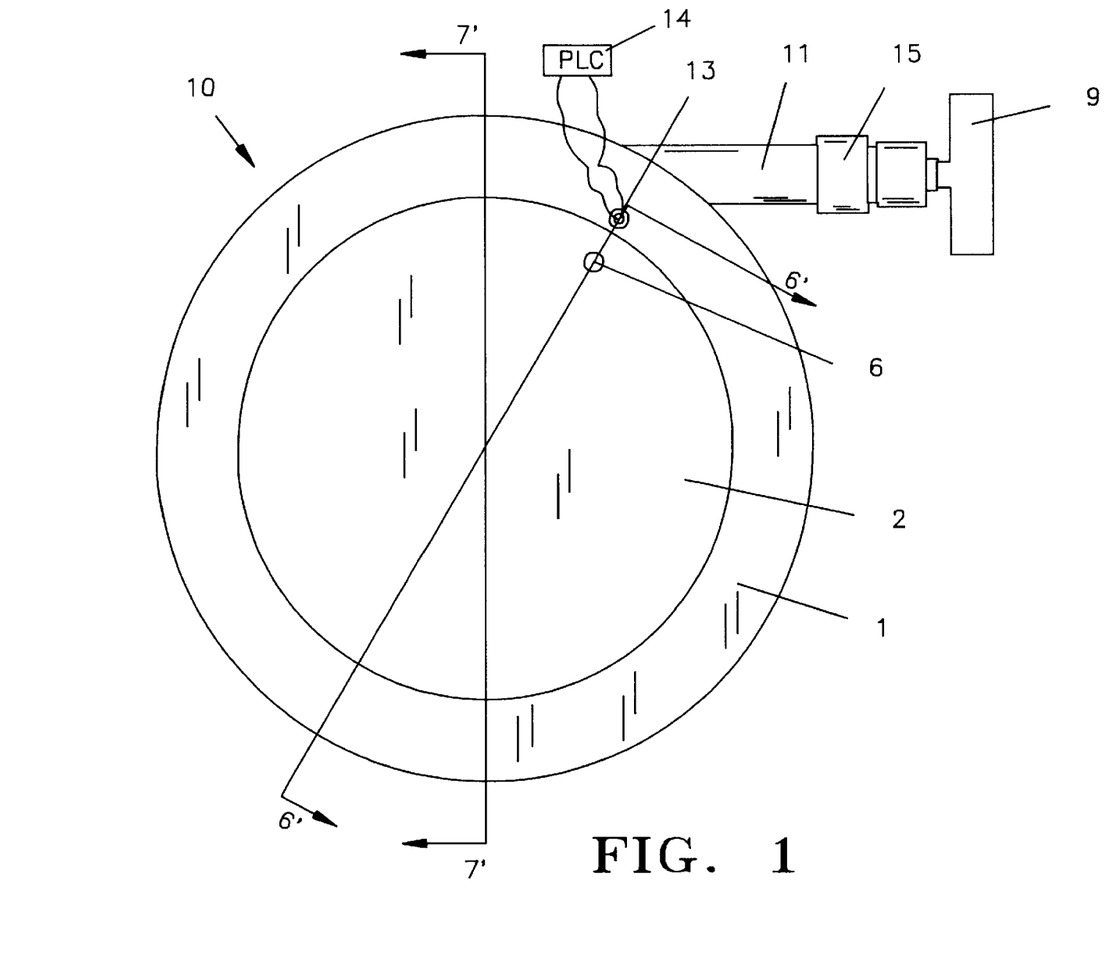
FIG. 1 is a top view of the pressure vessel.

FIG. 1 is a top view of the pressure vessel. Reference numeral 10 represents the pressure vessel. The pressure vessel is comprised of a housing 1 and a cover 2. FIG. 1 also illustrates a guide tube 11, a coupling 15 and a handle 9. Relief port 6 is shown in the cover 2. The top portion of the proximity sensor 13 is shown electrically interconnected with a programmable logic controller 14.

Figure 1A:
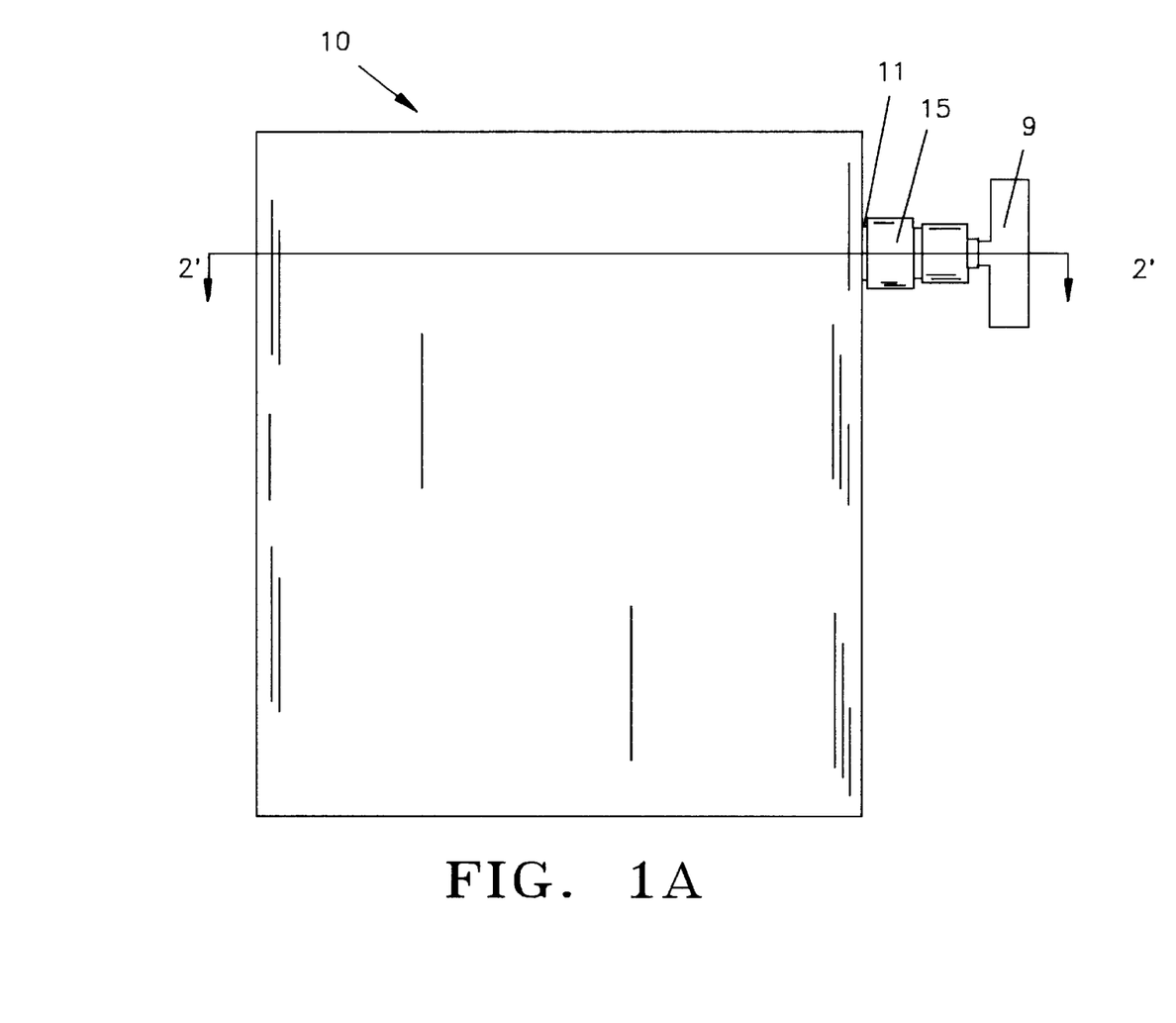
FIG. 1A is a front view of the pressure vessel.

FIG. 1A is a front view of the pressure vessel 10.

Figure 2:
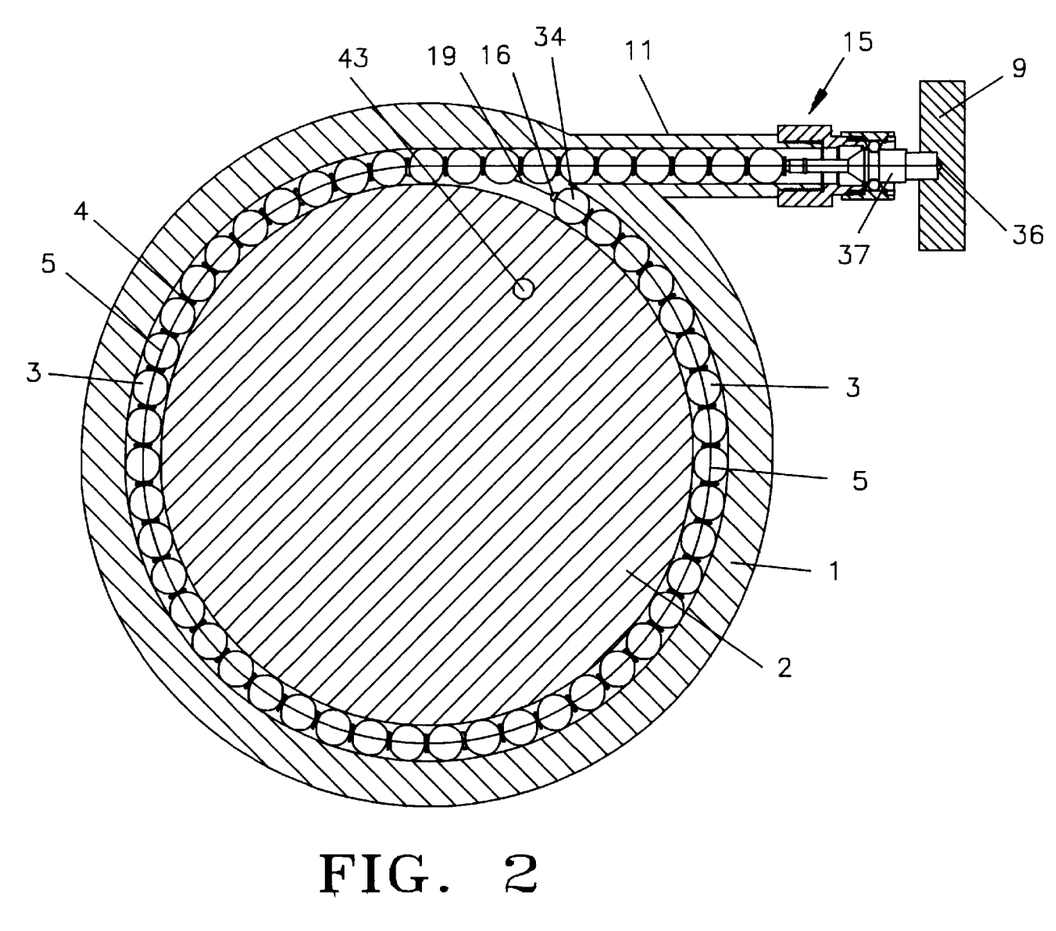

FIG. 2 is a cross-sectional view of the pressure vessel assembly taken along the line 2'—2' of FIG. 1A. FIG. 2 illustrates the housing 1, cover 2, the cable 5, the slugs 3, and the spacers 4. Additionally, FIG. 2 illustrates the guide tube 11 and the coupling 15 in cross section.

FIG. 2 additionally illustrates the passageway 43 through the stop 23. Passageway 43 and stop 23 are best viewed in FIG. 9. FIG. 2 represents a cross-sectional area taken through the middle of the slugs 3. Cable 5 as shown in FIG. 2 is also taken in section.

Figure 2A:
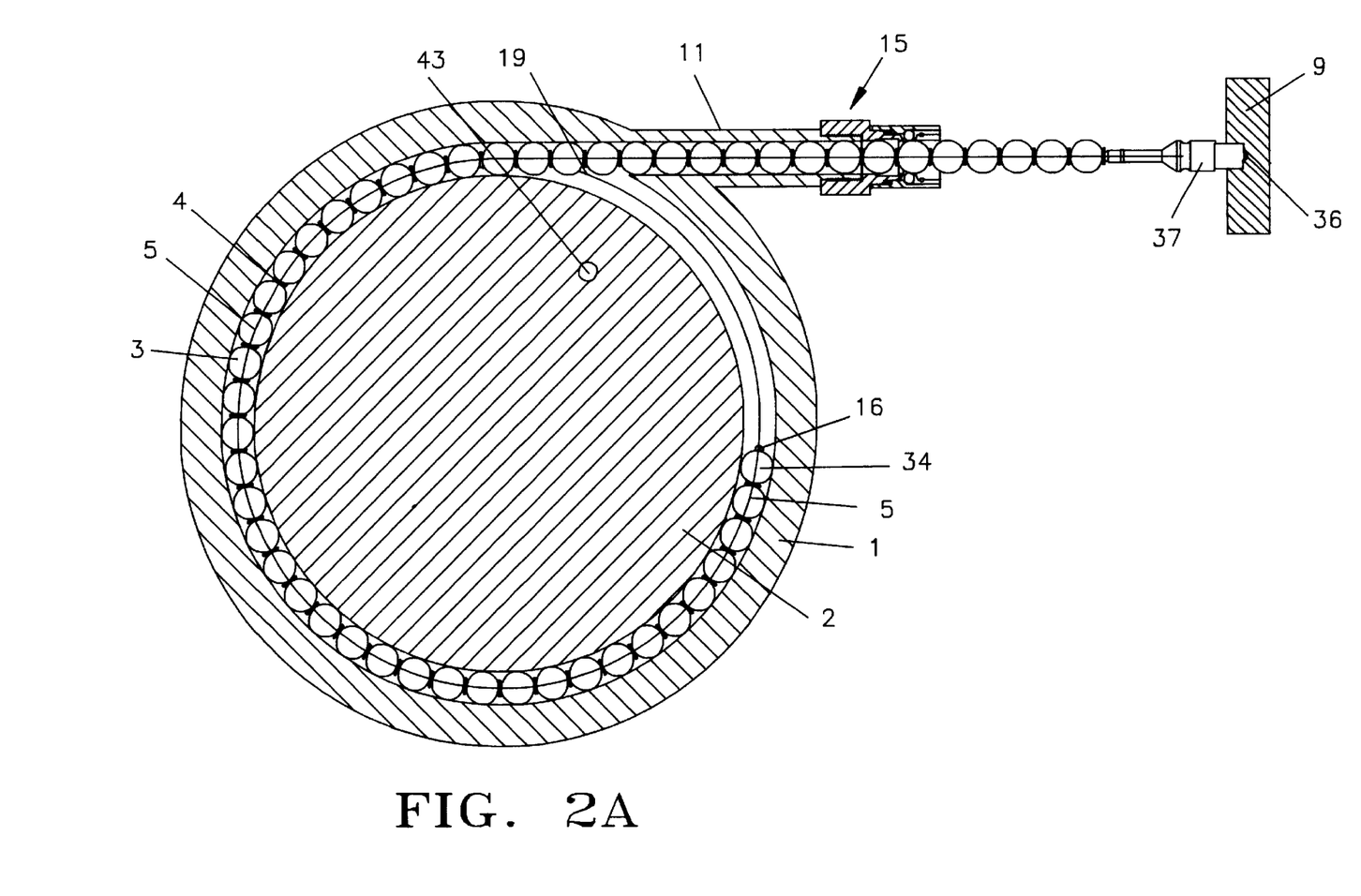
FIG. 2A illustrates the cable-slugs-spacers assembly partially inserted.
Figure 4:
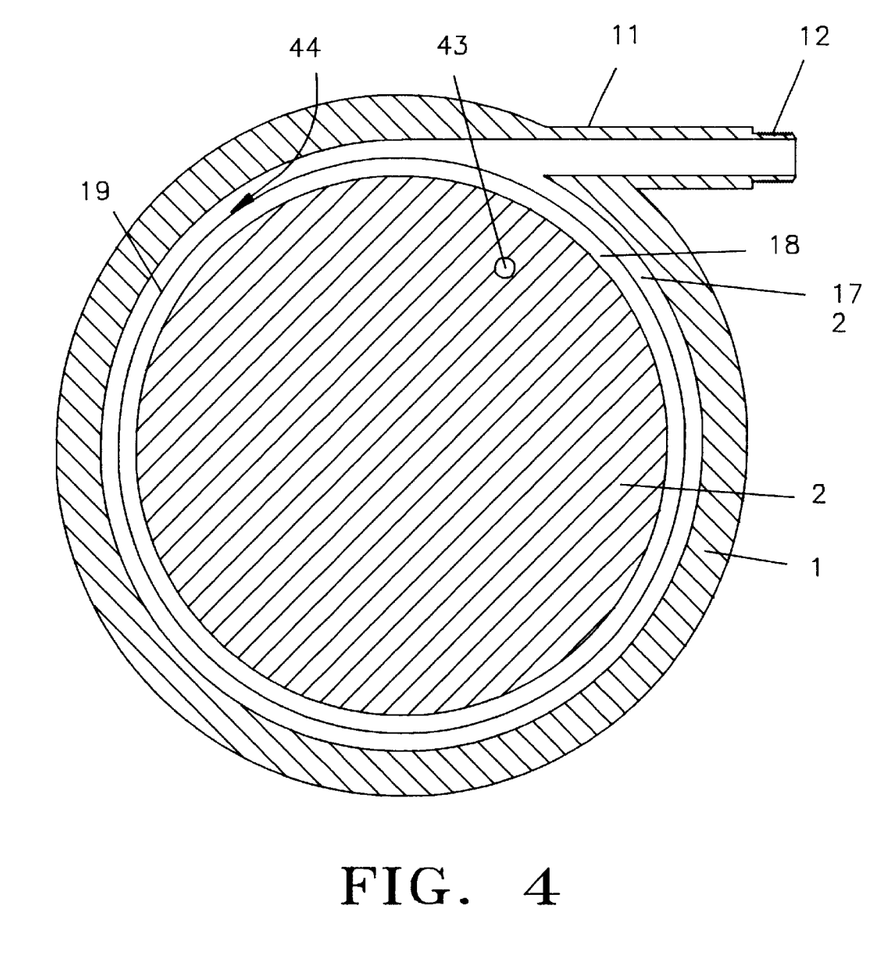
FIG. 4 is a cross-sectional view similar to FIG. 2 with the difference being that the cable-slugs-spacers assembly is not illustrated.

FIG. 2 further illustrates the first slug 34 which was inserted into the guide tube 11. Slug 34 is restrained from further movement on the cable by the crimped end portion 16 of the cable. Slug 34 would have entered the guide tube first at approximately the position where the arrow for reference numeral 15 is pointing. It then would have progressed toward the annulus 44 as illustrated in FIG. 4 which is formed by the slot 33 in cover 2 (see FIG. 4A) and the slot 42 in the housing (See FIG. 7A). The slug 34 then proceeds in a counterclockwise direction. FIG. 2A illustrates the cable-slugs-spacers assembly partially inserted. In FIG. 2A the slug 34 has not progressed sufficiently to operate the safety equipment depicted in FIGS. 6 and 9. These drawings will be discussed in detail hereinbelow. To operate the safety equipment, the slug 34, which is sometimes referred to herein as the first slug or the first entrant slug, must proceed all the way to the location shown in FIG. 2. Reference numeral 19 as shown in in FIG. 2 represents the interface between the cover 1 and the vessel 2 at the bottom of their respective slots.

Figure 3:
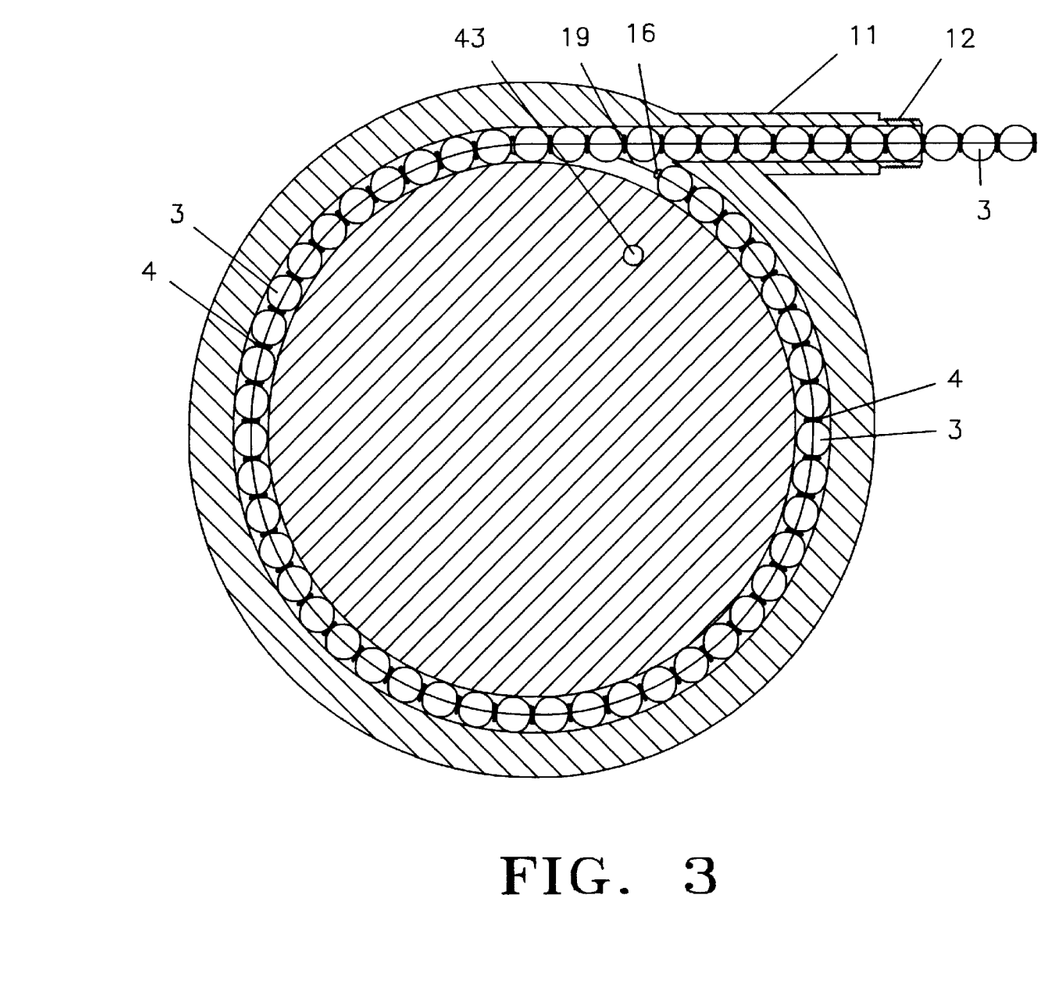
FIG. 3 is a cross-sectional view similar to FIG. 2 with the difference being that additional slugs are illustrated and the coupling and handle assembly are not illustrated.

FIG. 3 is a cross-sectional view similar to FIG. 2 with the difference being that additional slugs 3 are illustrated and the coupling and the handle assembly are not illustrated. FIG. 3 shows the threaded connection 12 for the quick disconnect coupling 15. The additional slugs are shown in FIG. 3 for the purpose of illustrating that more or less slugs may be employed depending on the geometry that someone skilled in the art may use in regard to the length of the guide tube 11.

Referring to FIG. 2 reference numeral 36 indicates a crimped end of the cable 5. Reference numeral 37 in FIG. 2 illustrates the male half of the coupling 15. The cable 5 passes through a bore 45 in the male half of the coupling 37. See FIG. 8A wherein the bore is illustrated in the male half 37 of the coupling 15. FIG. 4 is a cross-sectional view similar to FIG. 2 with the difference being that the cable-slugs-spacers assembly is not illustrated. FIG. 4 illustrates a portion of the annulus 44 formed by the slot 33 in cover 2 and the slot 42 in the housing. The bottom 17 of the vessel slot 42 is illustrated in FIG. 4 as is the bottom 18 of cover slot 33. The bottom 18 of cover slot 33 engages the bottom of the slugs 5. See FIG. 9. When the cover and the vessel are pressurized, see FIG. 9 wherein it is illustrated that the shoulder 18 or bottom 18 of the slot 33 is shown engaging the bottom 32 of slug 34. When the vessel is pressurized the cover 2 is lifted slightly upwardly and shoulder 18 of the slot 33 engages the bottom of slug 34 and forces it along with the other slugs 5 into engagement with the vessel. See FIG. 9 wherein it is indicated that the top 35 of slug 34 engages the upper shoulder 46 of the vessel 1.

Figure 9:
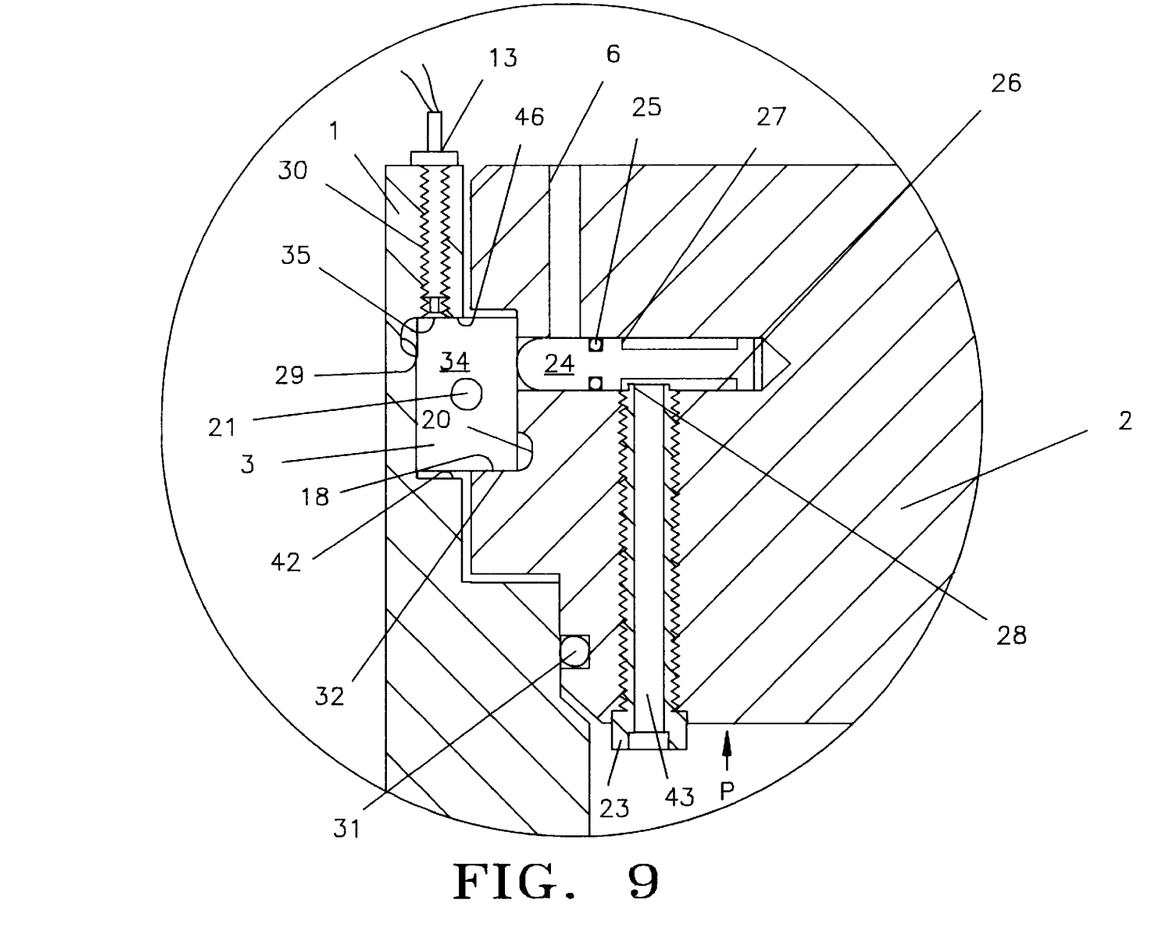
FIG. 9 is an enlarged cross-sectional view of a portion of FIG. 6 illustrating the relief mechanism and the proximity probe.

It will be noted by those skilled in the art that the spaces illustrated in FIG. 9 are by way of example only and are in reality very small spaces or gaps.

Figure 4A:
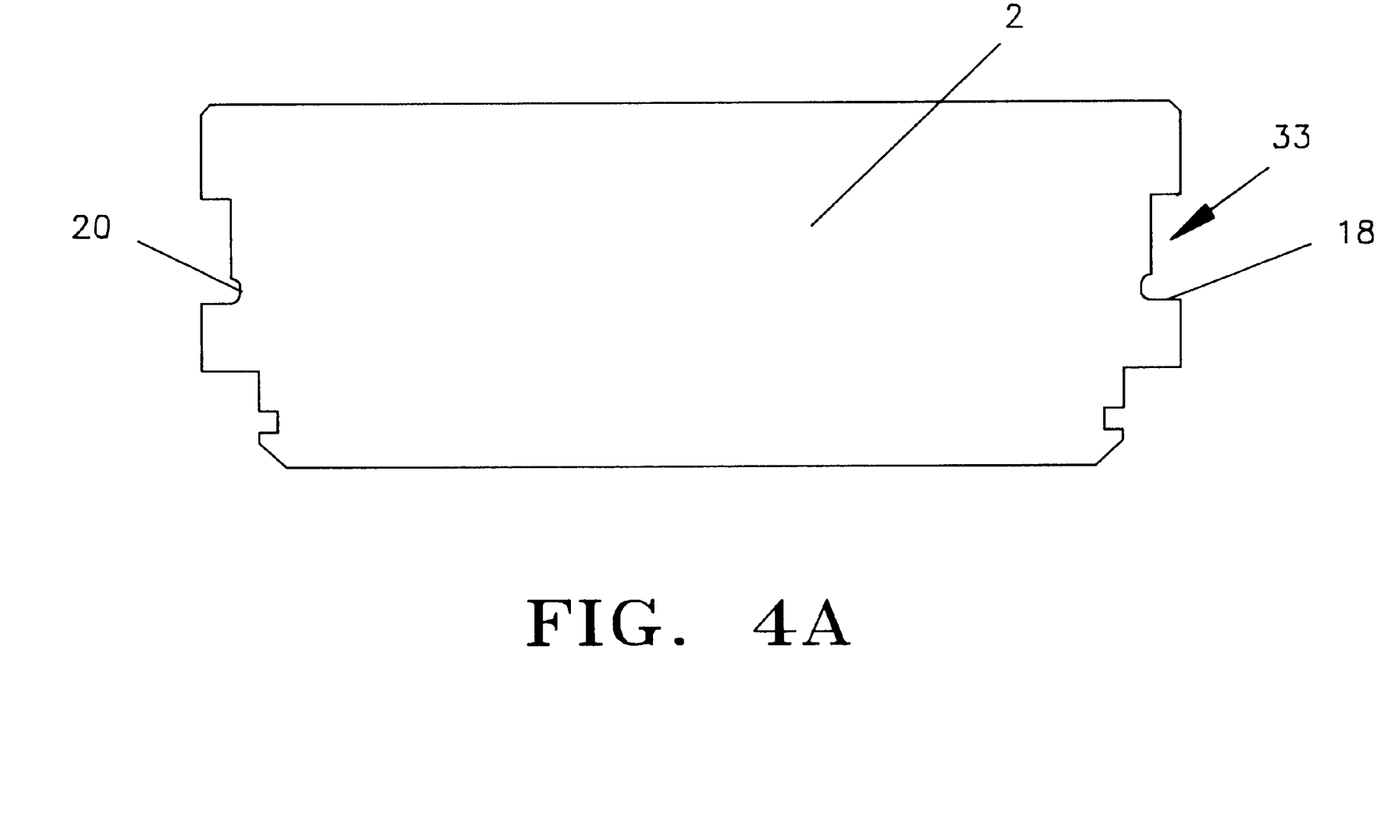
FIG. 4A illustrates an enlarged front view of the cover illustrating the slot and groove in the slot in the cover.

The slugs are preferably made from 316 stainless steel. They have a height of approximately 0.75 inches and a diameter of 0.50 inches. The washers sometimes referred to herein as spacers, are preferably 0.03 inches thick and they are 0.25 inches in diameter. Referring to FIG. 4A a front view of the cover illustrating the slot 33 and the groove 20 is illustrated. The groove relieves stress. A similar groove 29 is employed in the housing 1. See FIG. 9.

Figures 5, 5A:
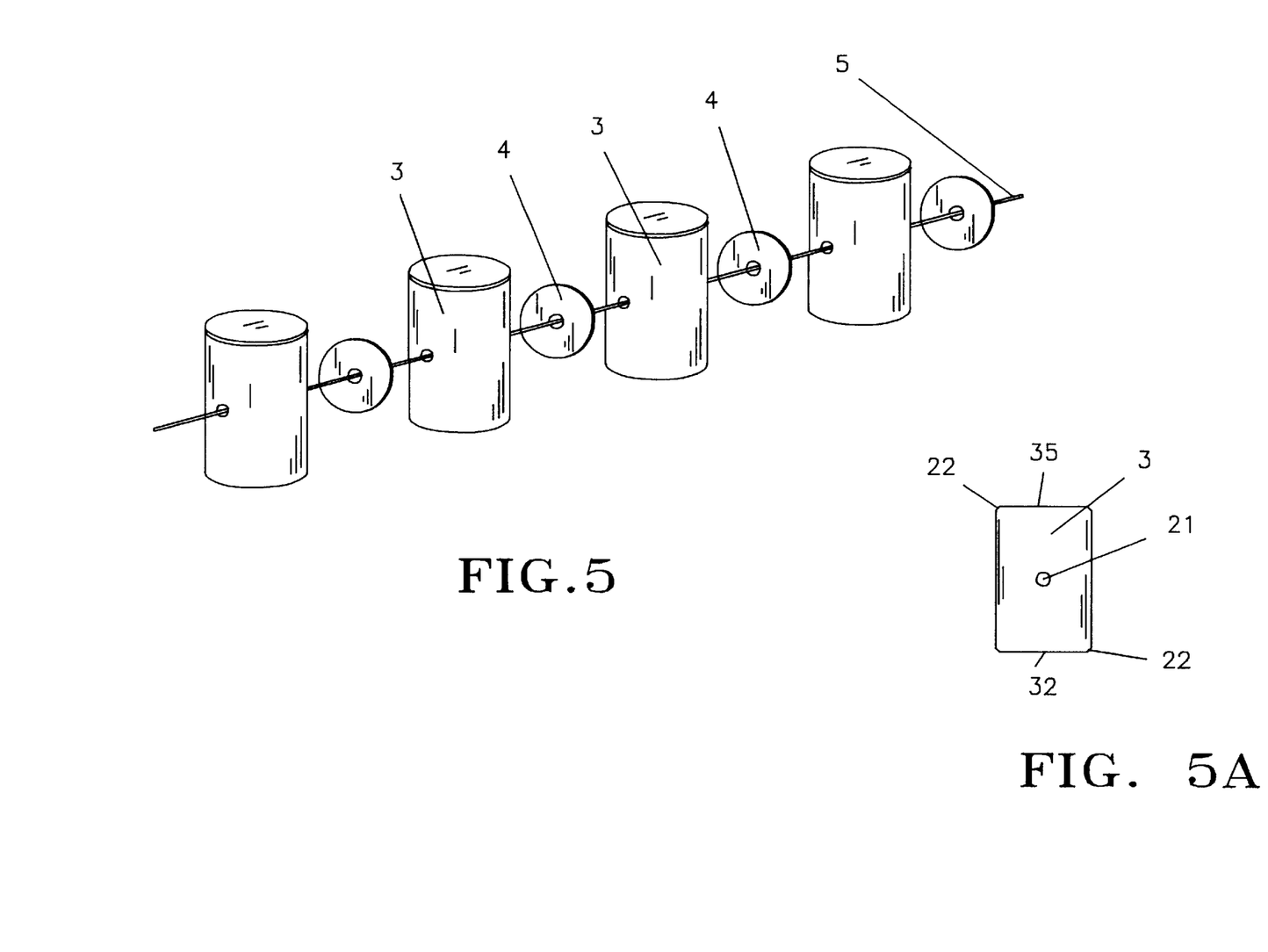
FIG. 5 illustrates the cable passing through several slugs and spacers.
FIG. 5A illustrates a front view of one of the cylindrical slugs.

FIG. 5 illustrates the slugs in combination with the spacers 4 and the cable 5. The slugs each have an aperture which runs therethrough. FIG. 5A illustrates the aperture 21 in the slugs 3. FIG. 5A also illustrates the chamfered end portions of the slugs 3. Reference numeral 32 indicates the bottom of the slugs 3 and reference numeral 35 illustrates the top of the slugs 3. Preferably the cable is manufactured from 304 stainless steel and its diameter is approximately 5/32 inches. Aircraft cable is believed to be suitable for this purpose.

Figure 6:
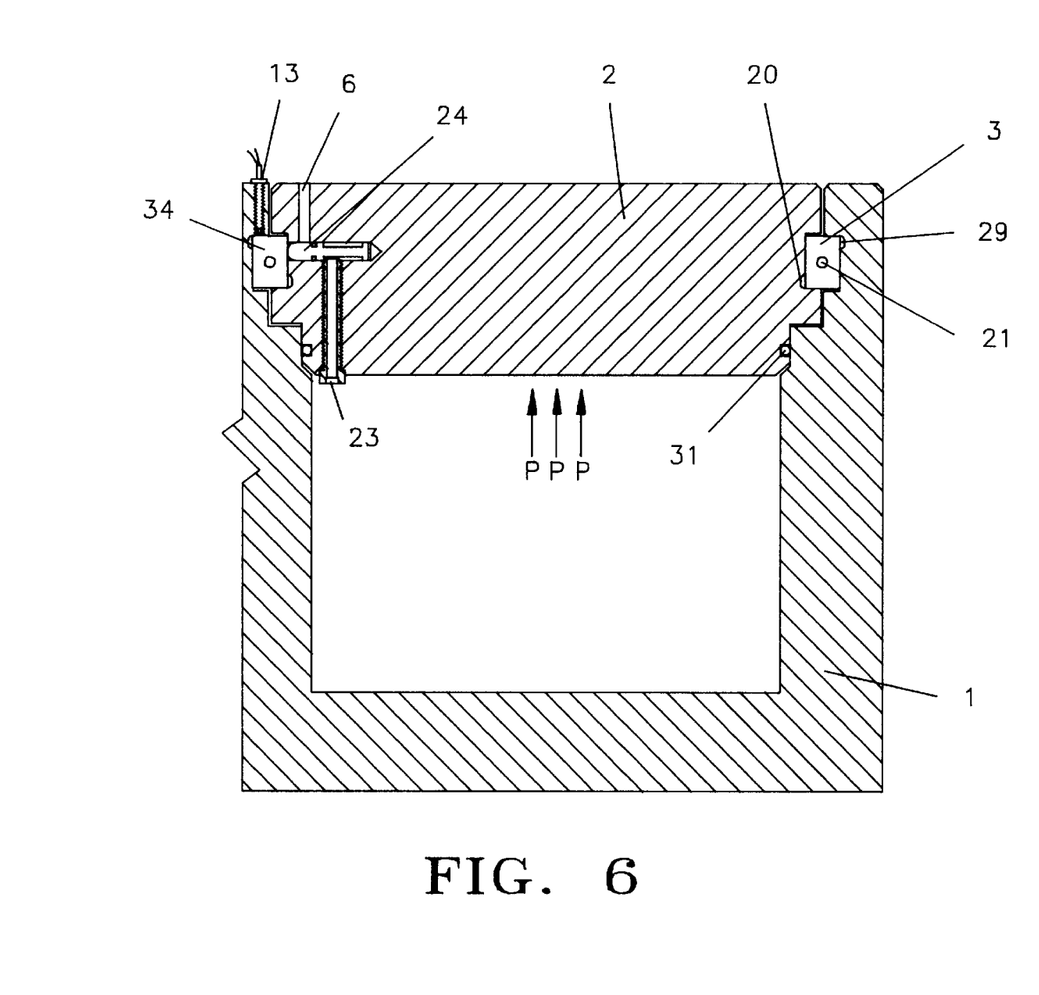
FIG. 6 illustrates a partial cross-sectional view of the pressure vessel taken along the lines 6'—6' in FIG. 1.

FIG. 6 illustrates a partial cross-sectional view of the pressure vessels taken along the lines 6'—6' in FIG. 1. FIG. 6 illustrates pressure denoted by the letter P being applied inside the pressure vessel and acting upon the cover. In this situation the cover urges the slugs into engagement with the housing. FIG. 6 illustrates slug 34 sometimes referred to herein as the first slug or the entrant slug in proximity with the proximity sensor and in engagement with the plunger 24. FIGS. 6 and 9 illustrate the engagement of the proximity sensor 13 with the housing 1. Reference numeral 30 indicates a threaded interconnection between the proximity sensor and the housing 1. The preferred proximity sensor will be an inductive proximity sensor that is readily commercially available. Referring to FIG. 6, reference numeral 20 illustrates the groove in the slot in the cover and reference numeral 29 indicates the slot in the housing 1.

Figure 7:
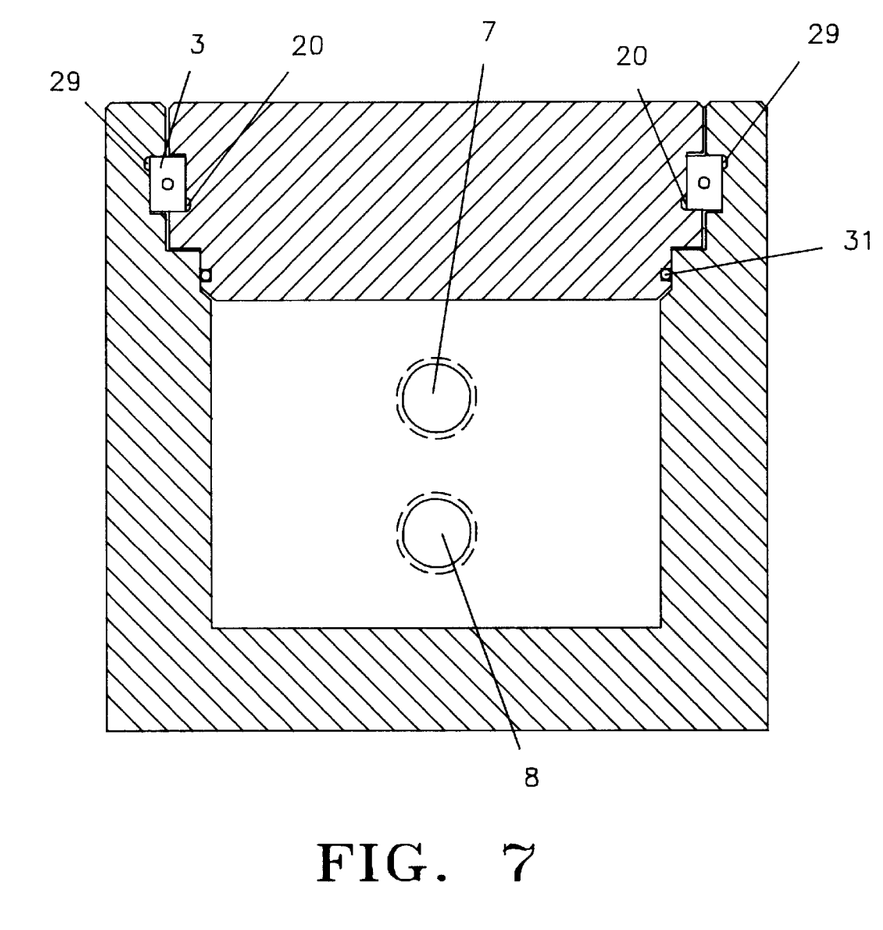
FIG. 7 illustrates a cross-sectional view of the pressure vessel taken along the lines 7'—7' of FIG. 1.

FIG. 7 illustrates a cross-sectional view of the pressure vessel taken along the lines 7'—7' of FIG. 1. Reference numeral 7 indicates an inlet port to the vessel and reference numeral 8 indicates an outlet port from the vessel. These ports enable pressurization for whatever use the vessel is subjected to.

Figure 7A:
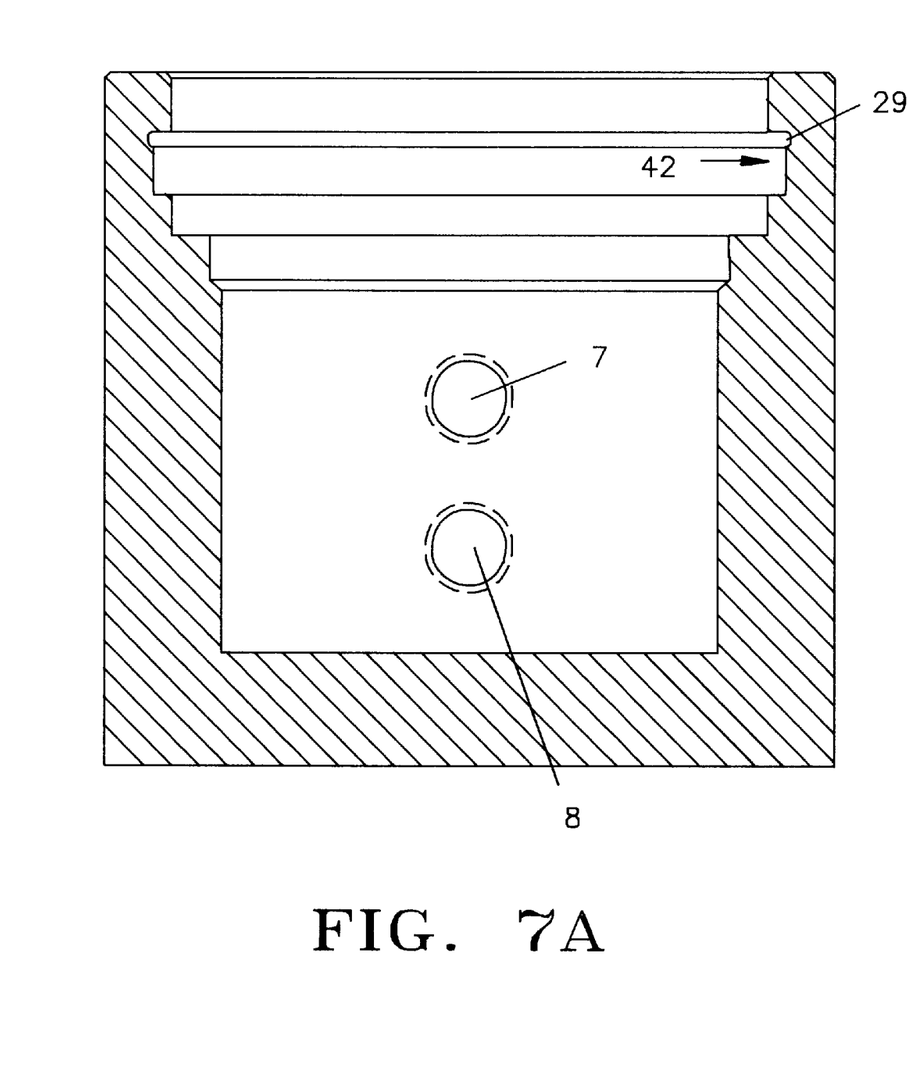
FIG. 7A is a cross-sectional view similar to FIG. 7 except the cover and the slugs are not illustrated.

FIG. 7A is a cross-sectional view similar to FIG. 7 except the cover and the slugs are not illustrated. FIG. 7A illustrates the slot 42 in the housing 1. Reference numeral 29 illustrates a groove in the slot 42.

Figures 8, 8A:
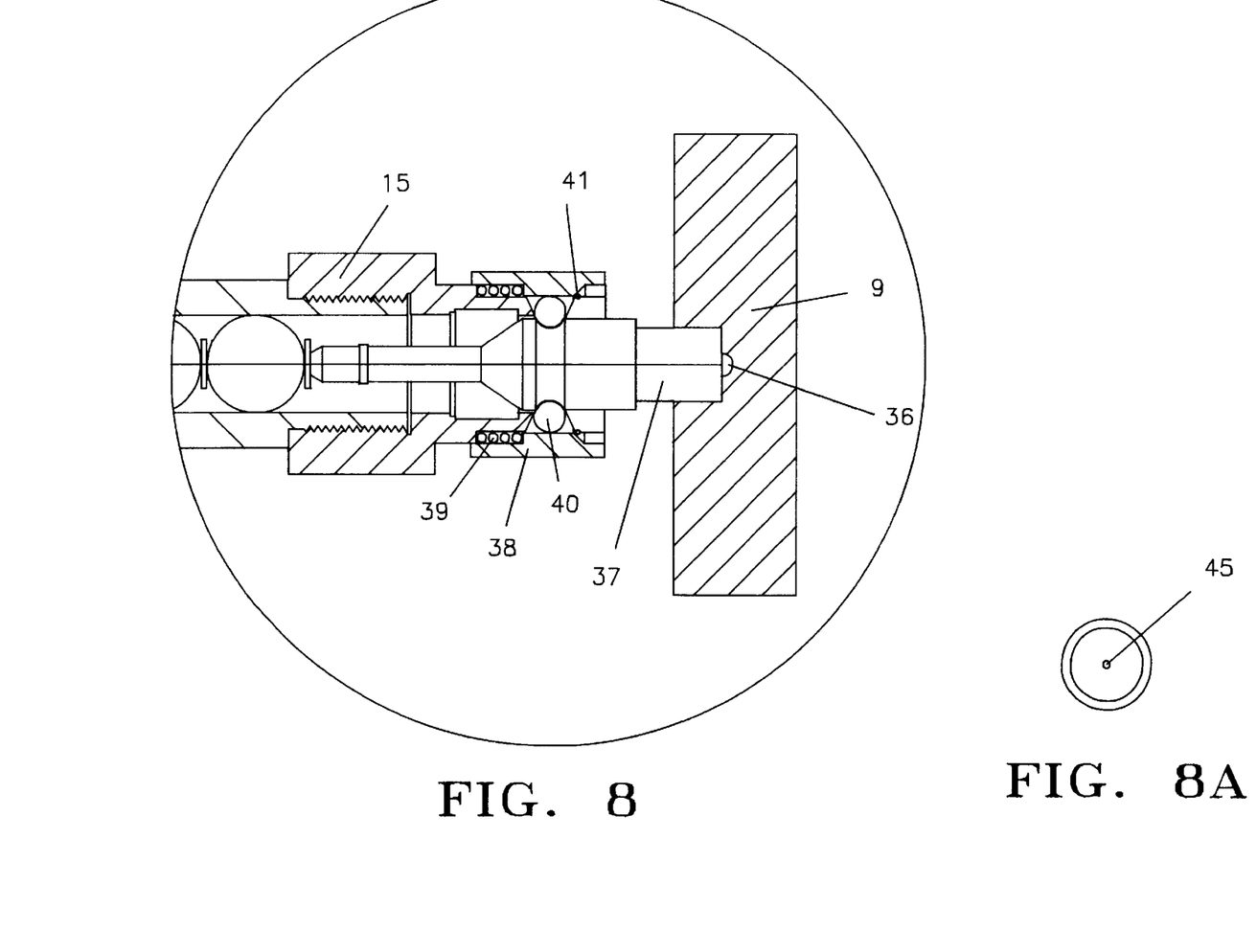
FIG. 8 illustrates an enlarged cross-sectional view of a portion of the guide tube, the coupling and the handle of the cable-slugs-spacers assembly.
FIG. 8A is an end view of the male half of the coupling.

FIG. 8 illustrates an enlarged cross-sectional view of a portion of the guide tube, the coupling, and the handle of the cable-slugs-spacers assembly. Reference numeral 41 is a snap ring that is mounted in the female body of the coupling 15. Snap ring 41 prevents sleeve 38 from escaping past the body of the coupling. Spring 39 urges the sleeve 38 outwardly up against the snap ring 41. Detents 40 engage a corresponding groove on the male half 37 of the coupling 15. The handle 9 may be affixed to the end of the male coupling by any number of ways known to those in the art such as a set screw.

FIG. 8A is an end view of the male half of the coupling illustrating a bore 45 therethrough.

FIG. 9 is an enlarged cross-sectional view of a portion of FIG. 6 illustrating the relief mechanism and the proximity probe. FIG. 9 illustrates the actuation of the proximity probe 13, an inductive proximity probe, by the first entrant slug 34. In viewing FIG. 2 slug 34 travels completely counterclockwise around the annulus and is positioned beneath the proximity probe 13 and actuates same. Proximity probe 13 as shown in FIG. 1 is inner connected electrically with a programmable logic controller. The programmable logic controller permits pressure to be applied to the vessel when slug 34 is beneath the proximity probe 13. Similarly slug 34 actuates the plunger 24 forcing the plunger rightwardly when viewing FIG. 9. As plunger 24 moves rightwardly, seals 25 seal the pressure that is being applied within the vessel and which is also within the passageway 43 which acts upon the pressure bearing surface 27 of plunger 24. However, plunger 24 cannot move leftwardly because it is blocked by slug 34. Thus, the pressure is trapped by the seals 25. Plunger 24 resides in plunger bore 26. The stop 23 is threaded into the cover 2 and includes an end portion 28 which prohibits loss of the plunger 24 in the leftwardly direction upon removal of the cover after the cable-slugs-spacers assembly has been removed from the pressure vessel.

Seals 31 as illustrated in FIG. 9 seal between the cover 2 and the housing 1.

It will be appreciated by those skilled in the art that the foregoing description including the drawings set forth the invention by way of example only and in no way limit the invention as defined by the claims set forth hereinbelow. It will be understood by those skilled in the art that many modifications and changes may be made to the invention as disclosed herein without departing from the spirit and the scope of the invention as set forth in the Claims below.

What is claimed is:

1. A pressure vessel comprising a housing and a cover, said housing includes a slot and said cover includes a slot, said slots in combination form an annulus, a plurality of slugs, a cable, said slugs each include an aperture therethrough, said cable being crimped at each end thereof linking said slugs together, said slugs and said cable are interposed in said annulus preventing said cover from being extricated from said housing when said vessel is pressurized.

2. A pressure vessel as claimed in claim 1 further comprising means for relieving pressure within said vessel.

3. A pressure vessel as claimed in claim 1 further comprising a guide tube for inserting said cable and said slugs in said annulus.

4. A pressure vessel as claimed in claim 3 further comprising a coupling for locking said cable and said slugs in said annulus.

5. A pressure vessel as claimed in claim 3 further comprising means for relieving pressure within said vessel.

6. A pressure vessel as claimed in claim 3 wherein said cover includes a plunger bore, a plunger, a stop and a pressure relief port, and, one of said slugs engages and positions said plunger so as to prohibit relief of pressure within said vessel.

7. A pressure vessel as claimed in claim 6 wherein said one of said slugs is the first slug inserted into said annulus.

8. A pressure vessel as claimed in claim 3 further comprising a proximity probe, said proximity probe sensing the first slug inserted into said annulus.

9. A pressure vessel as claimed in claim 1 further comprising a proximity probe, said proximity probe sensing one of said slugs in said annulus.

10. A pressure vessel as claimed in claim 9 wherein said proximity probe is mounted in said housing.

11. A pressure vessel as claimed in claim 1 wherein each of said slugs has a spacer interposed between each of said adjacent slugs.

12. A pressure vessel as claimed in claim 1 wherein each of said slots includes a groove therein.

13. A pressure vessel comprising: a housing and a cover; a cable; a plurality of slugs each having an aperture therethrough; a plurality of spacers each having an aperture therethrough; said housing includes a slot and a guide tube; said cover includes a slot; said slot of said housing and said slot of said housing forming an annulus; a coupling; said coupling including a female portion mounted to said guide tube of said housing and a male portion having a bore therethrough; said cable extending through said apertures in said slugs and said spacers and said bore of said male portion of said coupling; said cable being crimped at each end thereof linking said male portion of said coupling with said slugs and said spacers, said cable, spacers, slugs and male portion of said coupling being insertable into and removable from said guide tube and said annulus securing said cover in position with respect to said housing when said cable, spacers, slugs and male portion of said coupling are filly inserted into said guide tube and said annulus; and, said coupling locking said male portion of said coupling, said cables, said slugs and said spacers in said guide tube and said annulus.

14. A pressure vessel as claimed in claim 13 further comprising means for relieving pressure within said vessel when said male portion of said coupling, said cable, said slugs and said spacers are not fully inserted in said guide tube and said annulus.

15. A pressure vessel as claimed in claim 13 further comprising a proximity probe sensing one of said slugs in said annulus.

16. A pressure vessel as claimed in claim 13 wherein said slugs are generally cylindrically shaped.

17. A pressure vessel as claimed in claim 16 wherein said said slugs include chamfered end portions.

18. A pressure vessel as claimed in claim 13 where said slots in said housing and said cover each include grooves.

19. A locking mechanism for a pressure vessel comprising a plurality of generally cylindrically shaped slugs each having an aperture therethrough, a cable, said cable residing in each of said apertures of said slugs and being crimped at each end thereof, and, each of said slugs has a spacer interposed between each of said adjacent slugs.

* * * * *

UNITED STATES PATENT AND TRADEMARK OFFICE
CERTIFICATE OF CORRECTION

PATENT NO : 6,042,793
DATED : March 28, 2000
INVENTOR(S): Larry R. Rosio, et al.

It is certified that error appears in the above-identified patent and that said Letters Patent is hereby corrected as shown below:

Col. 6, line 33, delete "filly", and insert -- fully --.

Signed and Sealed this

Twenty-sixth Day of December, 2000

Attest:

Q. TODD DICKINSON

Attesting Officer

Director of Patents and Trademarks